Patented July 5, 1932

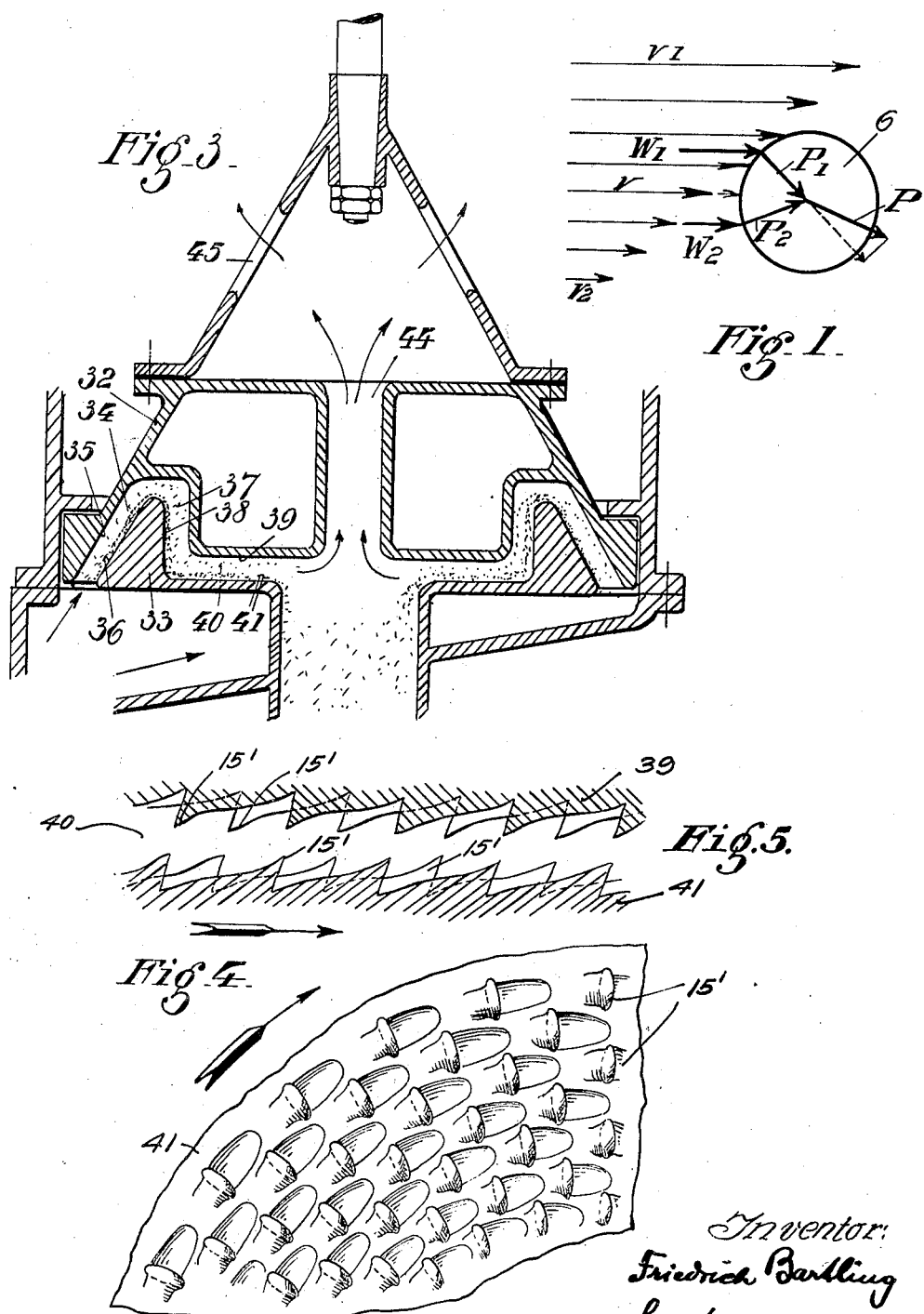

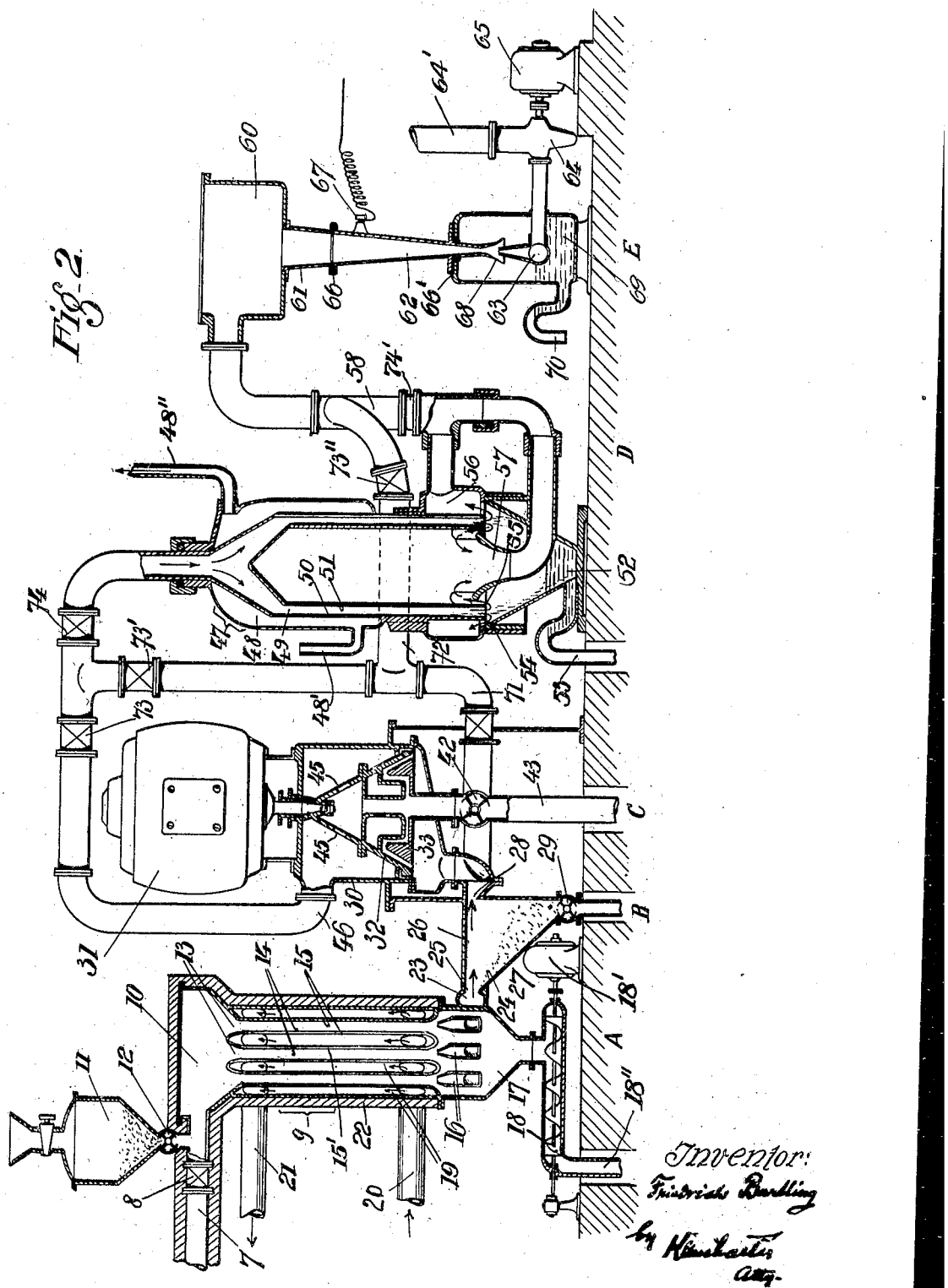

1,865,425

UNITED STATES PATENT OFFICE

FRIEDRICH BARTLING, OF HUGLFING, GERMANY

APPARATUS FOR SEPARATING FLOWING MEDIUMS

Application filed December 27, 1927, Serial No. 242,796, and in Germany December 31, 1926.

My invention relates to an apparatus for separating flowing mediums and particles of any kind which are carried by, or suspended in, such media. My invention may be applied to fluids of all kinds, such as liquids, gases, vapour and steam.

It is an object of my invention to perform the separation in continuous operation with a small input of energy.

It is another object of my invention to provide an apparatus by which very fine particles are separated, the separation of which involves great difficulties in connection with existing methods.

My invention is based on the graduatiton of the flow velocities which occurs in a fluid flowing along a wall which may be fixed or be endowed with a velocity of its own relative to the flow of the fluid. In the case of a fixed wall the velocity is a minimum in the immediate vicinity of the wall but increases gradually as the distance from the wall increases, and at a certain point is equal, or substantially equal, to the initial flow velocity. A particle suspended in the flowing medium will be deflected on account of the different velocities in the several regions, and according to my invention means are provided for separating the particles in those regions of the flow in which the velocity is equal, or substantially equal, to the initial velocity. The pressure of the flowing medium tends to cooperate in the separation of the particles and therefore it is not necessary that the particles while being separated should move against the very considerable resistance of the flowing medium as in existing methods, as centrifuging, hurling the medium against solid walls, or electrostatic ionization. Consequently the method involves considerable advantages over these existing methods, as centrifuging or shock ionization, and it is possible to increase the quantity of material treated for the same input of energy and at the same time to increase the efficiency of the operation.

In the drawings affixed to this specification and forming part thereof, the theory on which my apparatus is based, is illustrated by a diagram, and a low-temperature carbonization plant in which the method may be performed is illustrated diagrammatically by way of example.

In the drawings,

Fig. 1 is the diagram referred to,

Fig. 2 is an elevation of the complete low-temperature carbonization plant,

Fig. 3 is an axial section showing part of the separator which is illustrated diagrammatically in Fig. 2, more in detail and drawn to a larger scale, Fig. 4 is a detail illustrating part of the lower wall of a horizontal passage in the separator on a still larger scale, and Fig. 5 is a section showing part of the passage in section, drawn to the same scale as Fig. 4.

Referring first to Fig. 1, assume that 6 is a particle of any kind, here shown as a sphere, and that a medium is flowing from the left to the right with respect to the particle. Assume further that the velocity of the medium varies according to any law at right angles to the direction in which the medium is flowing, for instance, assume that it is reduced from the speed $v_1$ to the speed $v_2$ in accordance with a straight-line law.

The pressure W of the flow which is proportional to the square of the velocity exerts a more intense action on the upper half of the sphere 6 than on its lower half. The pressures $W_1$ and $W_2$ exert radial components $P_1$ and $P_2$ and only these components and not the specific gravity of particle 6, will influence the movement of the particle. The resultant is applied at the center of the square where the two components $P_1$ and $P_2$ intersect, and is indicated at P. The resultant P does not extend in parallel to the direction of the flow indicated by the arrows but is inclined toward the side of the smaller velocity $v_2$ so that the flow tends to move the particle 6 in the direction of the resultant P, that is, toward the region of the lower absolute or relative velocities $v_2$.

The variation of velocities in the flowing medium may be effected by any suitable means. A convenient expedient is the flow of the medium to be purified along walls the velocity of which is different from that of the flowing medium. In this case the medium flowing in the immediate vicinity of the walls assumes the velocity of the walls whereas at some distance from the walls the medium is flowing substantially at its initial velocity. In this manner, in the layers of the medium adjacent the walls a velocity gradient is established at right angles to the wall. This type of flow, the velocity of which is varying at right angles to the direction of flow, will be referred to as "border flow."

The force P which tends to separate the particle 6 from the medium is proportional to the area of the particle. As in particles of geometrically similar configuration the area is proportional to the square of the linear dimensions and the weight is proportional to the cube of the linear dimension, the action of the separating force P, related to unit weight, is increased in proportion with the reduction of the particle size. Consequently, the separating action will be the more effective the smaller the particles.

In other respects the separating action of the border flow is a function of the viscosity of the medium, the roughness of the surfaces along which it is flowing, and of the relative speeds.

It may be desirable to vary the temperature or the pressure of the medium in order to vary its viscosity and to effect a more efficient purification of the medium, or to obtain other commercial advantages. It may also be desirable to roughen the surfaces along which the medium is flowing, entirely or partly, the projections being fine or coarse, or to provide projections, baffles and the like on them.

Referring now to Fig. 2, the plant comprises a low-temperature carbonization retort A with means for supplying thereto gas and finely subdivided coal, and means for separating the coarsest coal particles from the gas after carbonization, separators B and C in which the residual particles are progressively separated from the gas, and separators D and E in which the oil is progressively separated from the gas. The pure gas is exhausted from the separator E by a blower 64 with a motor 65, and discharged through a pipe 64'.

Gas is admitted, preferably at elevated temperature, to the retort of the unit A through a pipe 7, the coal which is to be carbonized being admixed to the flowing gas before it enters the retort 9. The gas supply pipe 7 has a stop valve 8 through which hot gas is supplied to the low-temperature carbonization retort 9. 10 is a mixing chamber at the top of the retort 9 and 11 is a hopper arranged ahead of the mixing chamber 10 and provided with a rotary valve 12 through which a constant quantity of pulverulent coal from the hopper 11 per unit of volume of the flowing gas is added. The mixture of gas and pulverulent coal becomes practically stationary in the chamber 10. The base of the chamber is formed with a series of openings 13 connected with vertical passages 14. The area of the openings 13 and of the passages 14 is smaller than the area of the mixing chamber 10, and therefore the flow of the mixture is accelerated. Velocities are unequally distributed over the area of the passages 14. The velocity is a maximum at the center of the area so that the particles of coal are forced toward the walls 15 of the passages where the velocity is not much in excess of the initial velocity in the mixing chamber 10. 16 are nozzles at the lower ends of the passages 14 into which the purified gas is drawn by the suction of the blower 64. The separated coal particles move down along the walls 15 and are dropped past the outer walls of the suction nozzles and collected in a hopper 17 at the bottom of the retort from which a helix 18 which is rotated by suitable means, for instance a motor 18', discharges the finished coke through the vertical pipe 18".

The walls 15 of the passages 14 may be roughened more or less throughout their length or for a portion only, or may be provided with projections or baffles 15' as shown in Figs. 4 and 5 for the passage 40, Fig. 3 of the separator 30, Fig. 1, which will be described below, and such projections 15' may be staggered and if desired arranged along curved lines as indicated in Fig. 4, or along straight lines extending in parallel or at an angle to the direction in which the medium is flowing.

Heating flues 19 are arranged between the passages 14, 20 is a header for supplying a heating gas to, and 21 is a header for removing the heating gas from, the flues 19, the particles moving along the walls 15 being heated in countercurrent relation to the heating gas. Preferably, an insulating jacket 22 is provided for preventing loss of heat from the retort 9.

In the retort 9, the oils are expelled from the coal and at the same time, as the separator part 15 of the retort is designed on the border-flow principle, the major part of the coke is separated from the gas while the gas is still hot. The mixture of hot gas, fine globules of oil suspended therein and those particles of coke which have not been separated, are carried to the second separator unit B. This unit includes an intermediate separator 24 which is operated on the combined principles of decantation and border-flow. The gas from the nozzles 16 enters a pipe 23 the area of which is reduced at 25 so that the gas moves along the upper wall 26 of the separator at increased velocity. The suspended particles which should be maintained substantially at the initial velocity at which they were moving in the pipe 23, are moved in a downward direction, This corresponds to the case illustrated in Fig. 1, and the action is assisted by gravity which favors the separation of the heavy particles in the chamber 27. The purified gas is discharged through an opening 28 while the particles of coke, dust, etc., are removed at the bottom of the intermediate separator 24 by means of a distributor 29.

The gas discharged at the opening 28 still contains a certain percentage of very fine coke particles and dust, and these are removed in the third separator unit C which includes a separator 30. 31 is a motor, 32 is a conical sleeve, and 33 is a stationary conical part, arranged within the rotary sleeve 32 at some clearance. Gas from the opening 28 is admitted through the clearance between the cones 32, 33. The inner wall 35 of the rotary cone 32 imparts rotation to the gas, and the particles are deflected toward the stationary wall 36 against centrifugal action of the cone 35, along which they move upwards by their proper flow. However, it is also possible to combine the border-flow action with centrifugal action, and this is effected in a parallel annular passage 37 which is connected to the conical passage between the walls 35, 36. In this parallel passage the border-flow forces the particles into the zones of comparatively small velocity adjacent the stationary wall 38 in the cone 33.

The walls of the passages just referred to may be roughened or provided with projections 15' as described with reference to the walls 15 of the retort separator.

A horizontal passage 40 is connected to the passage 37 and the border-flow action also occurs at the walls of this passage which correspond to a rotary disc 39 and a stationary disc 41 and in consequence the particles move along the stationary disc 41, finally getting into a descending collecting pipe 43 with a rotary valve 42, while the gas which is now perfectly free from coke and other particles, but still contains oil, escapes through the central passage 44 and openings 45 in the rotary cone 32 to the pipe 46 which delivers it to the fourth unit or first oil separator D.

73 and 74 are valves for regulating the area of the pipe 46 and for controlling the connection of the separator 47 directly with the intermediate separator 24 by means of a pipe 71 and a by pass valve 73'. The separator 47 also operates on the border-flow principle and is preferably provided with a cooling jacket 48 in which water or another cooling medium is circulated by means of pipes 48' and 48''. Instead of, or in addition to this variation of the temperature the pressure of the gas may be varied while it is flowing in the separator 47 so as to assist the condensation of the oil vapour. The pressure regulation may be effected by adjusting the valve 74 or a valve 74' in the discharge pipe 58 of the separator, or both. Separation is effected by causing the gas to flow through a long annular space 49 between stationary walls 50 and 51 of the separator without alteration of its area. The walls may be provided with projections 15' or may be roughened for the purpose specified. The oil particles are forced toward the center of the passage 49 this being the zone in which the initial velocity is substantially maintained. Oil flows into the tank 53 at the bottom of the separator from the central zones of the passage 49 and is discharged by an overflow 53. The gas flows past the lower edges 54, 55 of the walls 50, 51, and is collected in chambers 56 and 57 which are both connected with the discharge pipe 58. A bye-pass valve 73'' in a pipe 72 serves for connecting the pipes 71 and 58.

Instead of stationary walls 50, 51, rotary walls, not shown, might be provided and roughened as shown in Fig. 5.

The substantially pure gas is finally delivered to the fifth unit or second oil separator E in which the residue of finest oil particles is separated. This separator comprises a settling chamber 60 in which the velocity of the gas becomes substantially nil. 61 is a conical pipe at the bottom of the collecting chamber 60, and 62 is a pipe of corresponding taper which is connected with the pipe 61 by means of flanges and an insulating washer 66. The velocity of the gas is increased due to the tapering of the pipes 61 and 62, and on account of the continuous acceleration of the flow in these pipes, a very efficient border separation is effected. The gas flows down in the axis of the pipes 61 and 62 at continuously increasing velocity and is intercepted at its flared end 68 by a nozzle 63, connected with the suction pipe of the blower 64. The oil particles are forced to the wall of the pipes 61, 62 as in these zones the velocity is not much in excess of the initial velocity in the collecting chamber 60.

Means for assisting the movement of the oil particles toward the wall of the pipes 61 and 62 may consist of electrostatic ionization, and means for performing this are illustrated. The pipe 62 is insulated from the pipe 61 by the washer 66, and from the collector 69 by a similar washer 66', and voltage is applied to the pipe 62 by means of a terminal 67. The voltage in the pipe exerts electrical attraction on the oil particles and the length of the part under voltage is such that the oil particles are discharged in the vicinity of the wall at the end 68 of the pipe before they are repelled by their own electrical charge. The oil in the collector 69 is discharged by an overflow pipe 70.

According to the degree of purity required some of the separators may be by-passed For instance, the separator 30 may be by-passed by means of the pipe 71 and the valves 73' and 74, and the separator 47 may be bypassed by means of the pipe 72 and the valve 73". Obviously, these separators may be cut out together or separately, as desired.

I wish it to be understood, that I do not desire to be limited to the exact details of construction shown and described for obvious modifications will occur to a person skilled in the art, and the plant illustrated has only been shown as an example for the versatility of the separation on the border-flow principle.

I claim:—

1. A separator comprising means for imparting initial velocity to a flowing medium and to particles suspended in, and flowing with, said medium, a conduit in which said medium flows, and means for separating said particles in that region where the velocity is substantially equal to said initial velocity.

2. A separator comprising means for imparting initial velocity to a flowing medium and to particles suspended in, and flowing with, said medium, a conduit in which said medium flows, electrostatic means for moving said particles toward the region where the velocity is substantially equal to the said initial velocity, and means for separating said particles in said region.

3. A separator comprising a rotary member for imparting rotational velocity to a flowing medium and to particles suspended in, and flowing with, said medium, a fixed member defining a passage with said rotary member, means on said rotary member for deflecting the flow of the medium toward the axis of said rotary member, and means for educting the separated particles from said passage and for educting the flowing medium from said rotary member.

4. A separator comprising a rotary member having an axial passage and adapted to impart rotational velocity to a flowing medium and to particles suspended in, and flowing with, said medium, and a fixed member defining a passage with said rotary member which extends transversely to the axis of said rotary member and is connected to said axial passage.

5. A separator comprising a rotary member having an axial passage and adapted to impart rotational velocity to a flowing medium and to particles suspended in, and flowing with, said medium, and a fixed member defining a passage with said rotary member which consists of reaches extending at right angles, at an acute angle and in parallel to the axis of said rotary member and is connected to its axial passage at the reach extending at right angles to said axis.

In testimony whereof I affix my signature.

FRIEDRICH BARTLING.